United States Patent
Okano et al.

(10) Patent No.: US 9,672,860 B2
(45) Date of Patent: Jun. 6, 2017

(54) RECORDING/REPRODUCING APPARATUS

(71) Applicant: Kabushiki Kaisha Toshiba, Minato-ku (JP)

(72) Inventors: Hideaki Okano, Yokohama (JP); Kazuo Watabe, Yokohama (JP); Akihito Ogawa, Fujisawa (JP); Takashi Usui, Saitama (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 0 days.

(21) Appl. No.: 15/050,665

(22) Filed: Feb. 23, 2016

(65) Prior Publication Data

US 2016/0171997 A1 Jun. 16, 2016

Related U.S. Application Data

(63) Continuation of application No. PCT/JP2013/074435, filed on Sep. 10, 2013.

(51) Int. Cl.
*G11B 7/00* (2006.01)
*G11B 7/1392* (2012.01)
(Continued)

(52) U.S. Cl.
CPC ........ *G11B 7/13927* (2013.01); *G11B 7/0903* (2013.01); *G11B 7/0909* (2013.01);
(Continued)

(58) Field of Classification Search
None
See application file for complete search history.

(56) References Cited

U.S. PATENT DOCUMENTS

2006/0233070 A1* 10/2006 Kurokawa ......... G11B 7/24079
369/44.23
2006/0250926 A1* 11/2006 Mizuno .................. G11B 7/126
369/100

(Continued)

FOREIGN PATENT DOCUMENTS

JP 5-36073 2/1993
JP 2002-117585 4/2002
(Continued)

OTHER PUBLICATIONS

International Search Report issued Oct. 8, 2013 in PCT/JP2013/074435, filed Sep. 10, 2013 (with English Translation).
(Continued)

*Primary Examiner* — Peter Vincent Agustin
(74) *Attorney, Agent, or Firm* — Oblon, McClelland, Maier & Neustadt, L.L.P.

(57) ABSTRACT

According to an embodiment, a recording/reproducing apparatus includes a diffraction grating and a light-receiving element. The diffraction grating divides return light from the guide layer in accordance with areas. The areas include a first area and a second area that does not overlap the first area. The light-receiving element includes (i) a first detecting cell group which receives a zero-order beam to which astigmatism is imparted, (ii) a second detecting cell group which receives at least one of a positive and negative first-order beam, which passes the first area and made astigmatic, and (iii) a third detecting cell group which receives at least one of a positive and negative first-order beam, which passes the second area and made astigmatic.

14 Claims, 15 Drawing Sheets

(51) Int. Cl.
*G11B 7/09* (2006.01)
*G11B 7/1353* (2012.01)
G11B 7/24038 (2013.01)
G11B 7/2405 (2013.01)
G11B 7/1374 (2012.01)

(52) U.S. Cl.
CPC .......... *G11B 7/1353* (2013.01); *G11B 7/1374* (2013.01); *G11B 7/2405* (2013.01); *G11B 7/24038* (2013.01)

(56) References Cited

U.S. PATENT DOCUMENTS

| | | |
|---|---|---|
| 2009/0168618 A1 | 7/2009 | Yamazaki |
| 2010/0182889 A1* | 7/2010 | Inoue .................. G11B 7/0053 369/103 |
| 2011/0044149 A1* | 2/2011 | Yamamoto ......... G11B 7/00736 369/100 |
| 2013/0051205 A1* | 2/2013 | Asada .................. G11B 7/1353 369/47.51 |
| 2016/0171997 A1* | 6/2016 | Okano ................. G11B 7/1374 369/44.32 |

FOREIGN PATENT DOCUMENTS

| | | |
|---|---|---|
| JP | 2009-157978 | 7/2009 |
| JP | 5043581 | 10/2012 |
| WO | WO 2011/125157 A1 | 10/2011 |

OTHER PUBLICATIONS

Written Opinion issued Oct. 8, 2013 in PCT/JP2013/074435, filed Sep. 10, 2013.

Masakazu Ogasawara et al. "Sixteen-Layer Write Once Disc with a Separated Guide Layer", Japanese Journal of Applied Physics, vol. 50, 2011, 6 pages.

* cited by examiner

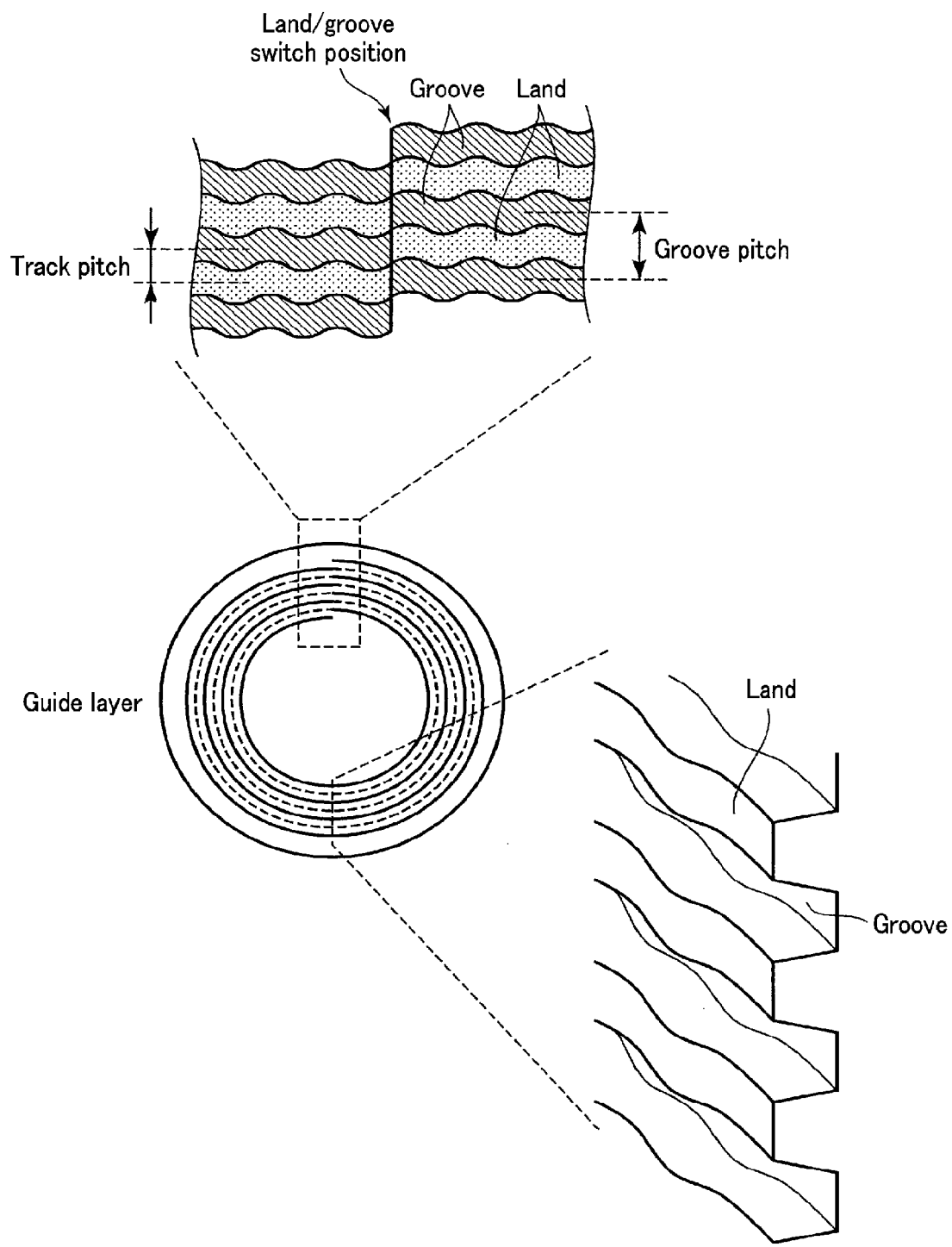
F I G. 6

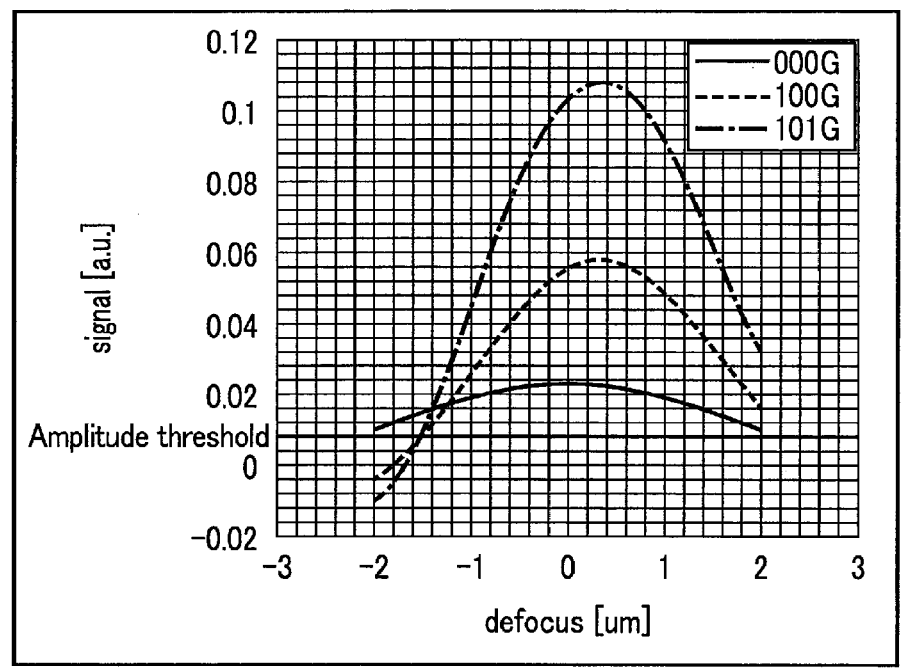
F I G. 12A
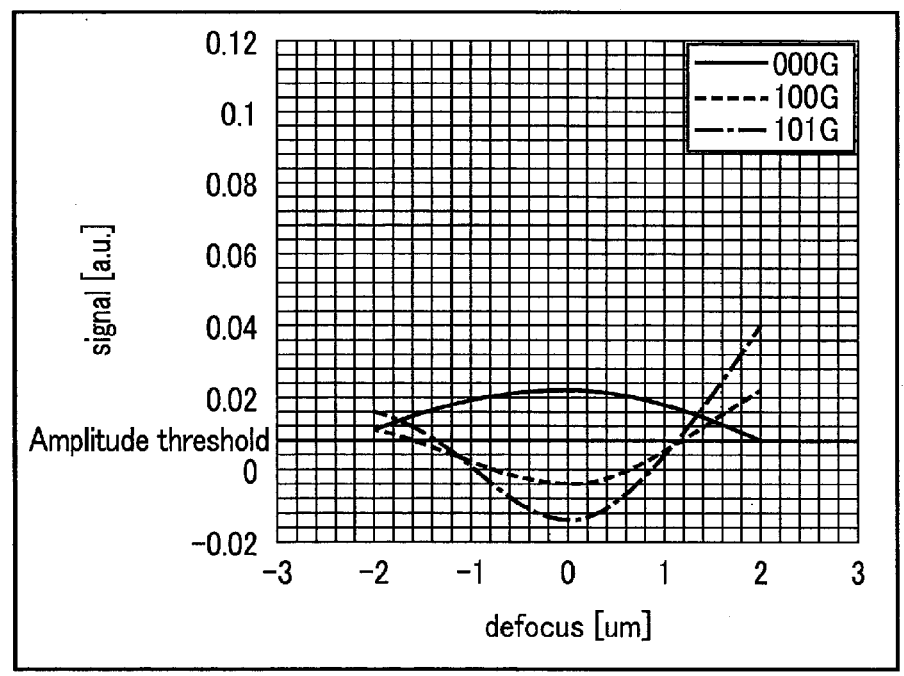
F I G. 12B

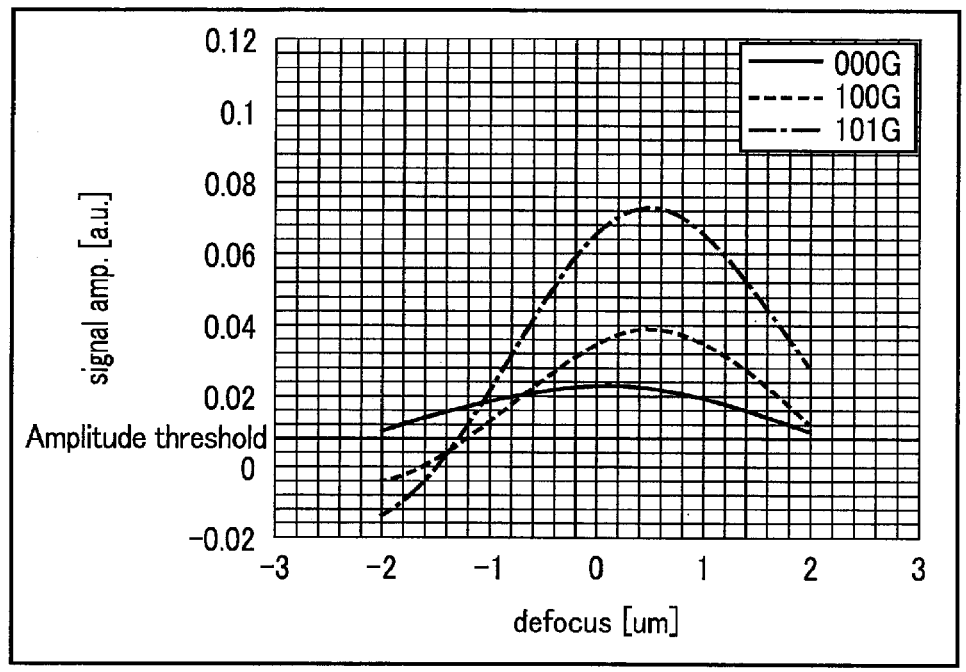
F I G. 13A
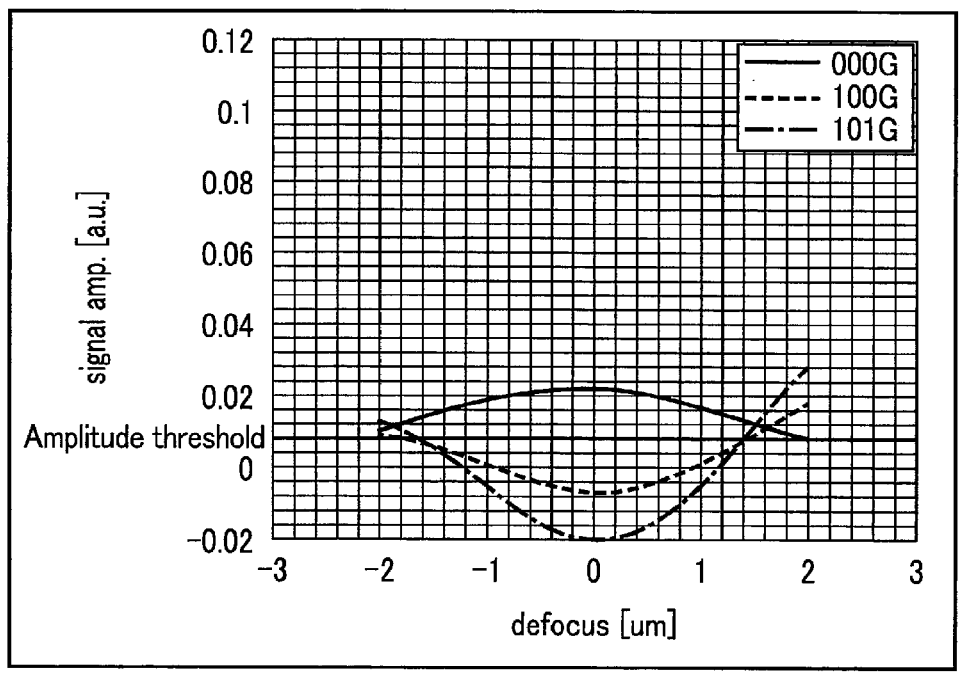
F I G. 13B

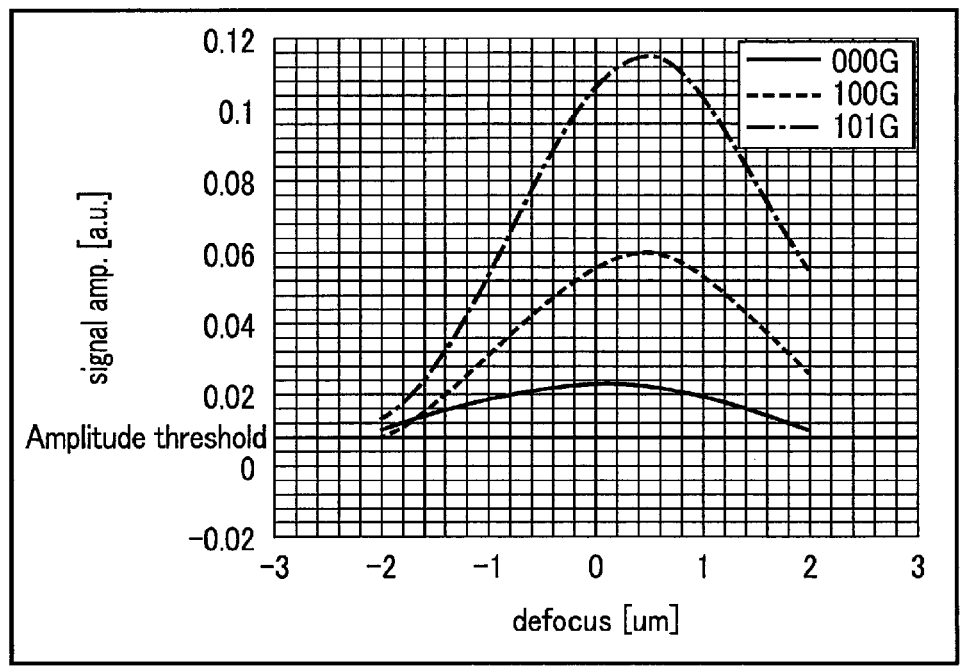
F I G. 14A
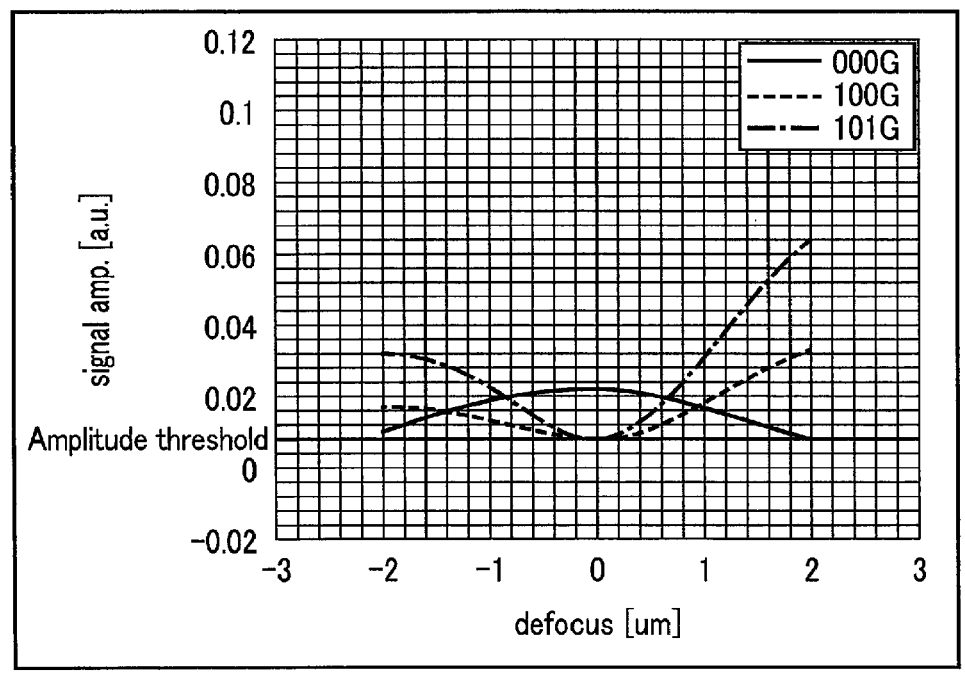
F I G. 14B

RECORDING/REPRODUCING APPARATUS

CROSS-REFERENCE TO RELATED APPLICATIONS

This application is a Continuation Application of PCT Application No. PCT/JP2013/074435, filed Sep. 10, 2013, the entire contents of which are incorporated herein by reference.

FIELD

Embodiments described herein relate generally to recording of information in an information recording medium and reproduction of information therefrom.

BACKGROUND

The storage capacity of an information recording medium (an optical disc) can be increased by increasing the number of layers of an information recording layer. For example, BDXL, which is extended specifications of Blu-ray disc (registered trademark), specifies an optical disc comprising a four-layered information recording layer. However, some types of optical disc have a problem in that the productivity lowers in accordance with an increase of the information recording layer (for example, the manufacturing yield may become poor, the takt time in manufacture may lengthen, etc.). This problem is attributable to the process in which a spiral track groove is molded (transcribed) in each information recording layer.

The problem mentioned above may not occur in a guide-layer-separated optical disc. The guide-layer-separated optical disc comprises a plurality of information recording layers and guide layers provided independently of the information recording layers. (The guide layers are also referred to as servo layers.) In the guide-layer-separated optical discs, the groove mentioned above is formed on the guide layers, but not on the information recording layers. Since the groove is formed on the guide layers, which are smaller in number than the information recording layers, the productivity does not much lower despite an increase in the number of information recording layers.

BRIEF DESCRIPTION OF DRAWINGS

FIG. 6 shows an example of a guide layer employed in the information recording medium depicted in FIG. 2.

FIG. 12A is a graph showing a simulation result of how a defocus margin of a wobble reproduction signal according to the first comparative example is when spherical aberration is not generated.

FIG. 12B is a graph showing a simulation result of how a defocus margin of a wobble reproduction signal according to the first comparative example is when spherical aberration is generated.

FIG. 13A is a graph showing a simulation result of how a defocus margin of a wobble reproduction signal according to the second comparative example is when spherical aberration is not generated.

FIG. 13B is a graph showing a simulation result of how a defocus margin of a wobble reproduction signal according to the second comparative example is when spherical aberration is generated.

FIG. 14A is a graph showing a simulation result of how a defocus margin of a preferred wobble reproduction signal is when spherical aberration is not generated.

FIG. 14B is a graph showing a simulation result of how a defocus margin of a preferred wobble reproduction signal is when spherical aberration is generated.

DETAILED DESCRIPTION

A description will now be given of the embodiments with reference to the accompanying drawings.

According to an embodiment, a recording/reproducing apparatus includes an objective lens, an area-dividing diffraction grating, an astigmatic optical system, a light-receiving element and a generation circuit. The objective lens focuses guide light on a guide layer in an information recording medium and focuses information recording light on an information recording layer in the information recording medium. The area-dividing diffraction grating divides return light from the guide layer in accordance with a plurality of areas. The areas include a first area and a second area that does not overlap the first area. The astigmatic optical system imparts astigmatism to a zero-order beam, a positive first-order beam and a negative first-order beam, into which the return light is divided by the area-dividing diffraction grating. The light-receiving element includes (i) a first light-detecting cell group which receives a zero-order beam to which astigmatism is imparted by the astigmatic optical system, (ii) a second light-detecting cell group which receives at least one of a positive first-order beam and a negative first-order beam, which passes the first area and made astigmatic by the astigmatic optical system, and (iii) a third light-detecting cell group which receives at least one of a positive first-order beam and a negative first-order beam, which passes the second area and made astigmatic by the astigmatic optical system. The generation circuit generates a focus error signal based on an amount of light falling on the first light-detecting cell group, and generates a wobble reproduction signal based on an amount of light falling on the second light-detecting cell group and the third light-detecting cell group.

In the descriptions below, the same respective reference numbers will be used to denote elements similar or corresponding to described elements, and redundant explanations will be avoided.

First Embodiment

Figure 1:
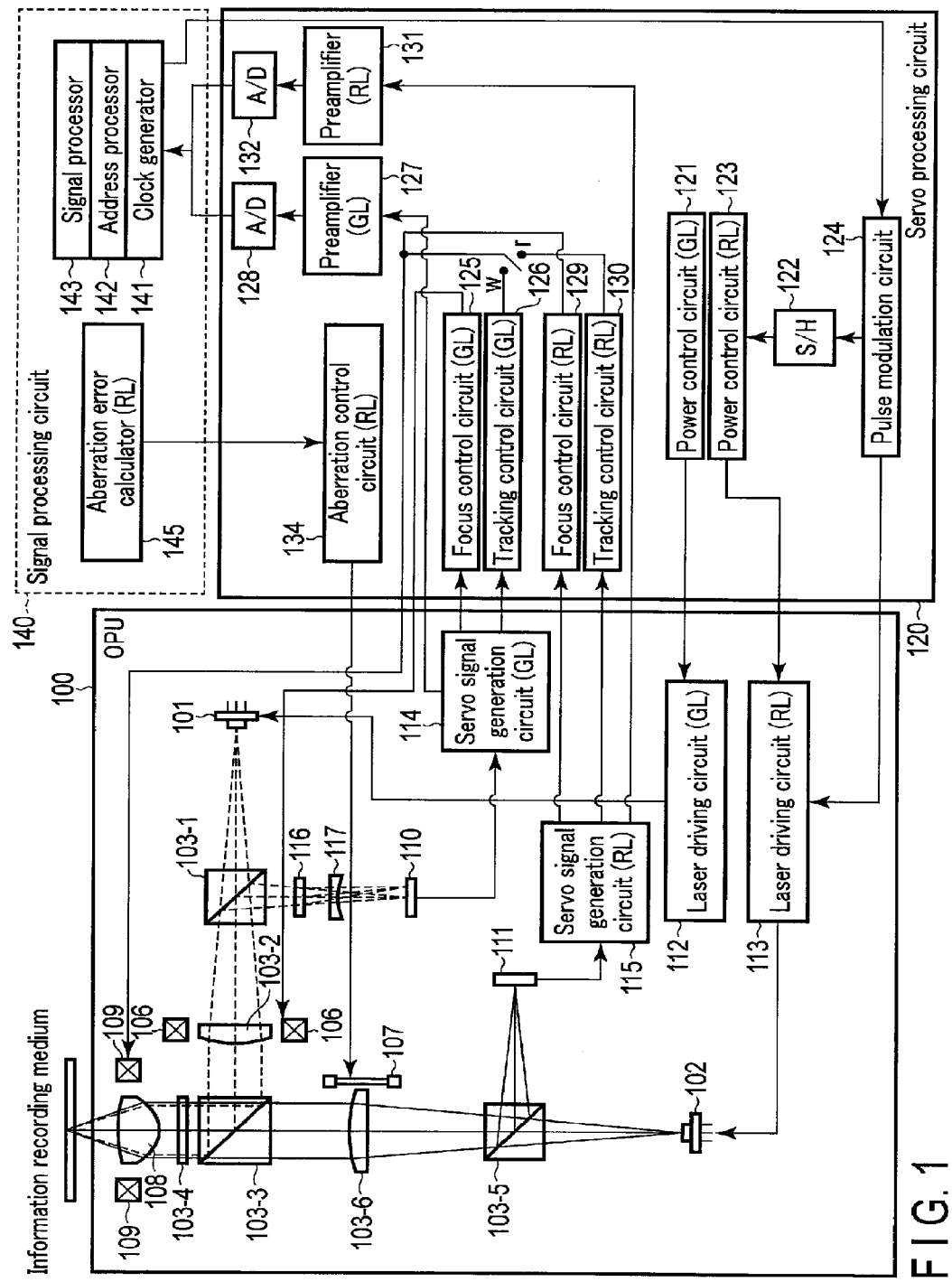
FIG. 1 shows an example of a recording/reproducing apparatus according to the first embodiment.

As shown in FIG. 1, the recording/reproducing apparatus of the first embodiment comprises an optical pickup unit (OPU) 100, a servo processing circuit 120 and a signal processing circuit 140. The recording/reproducing apparatus shown in FIG. 1 records information in an information recording medium (optical disc) and reproduces the information therefrom.

Figure 2:
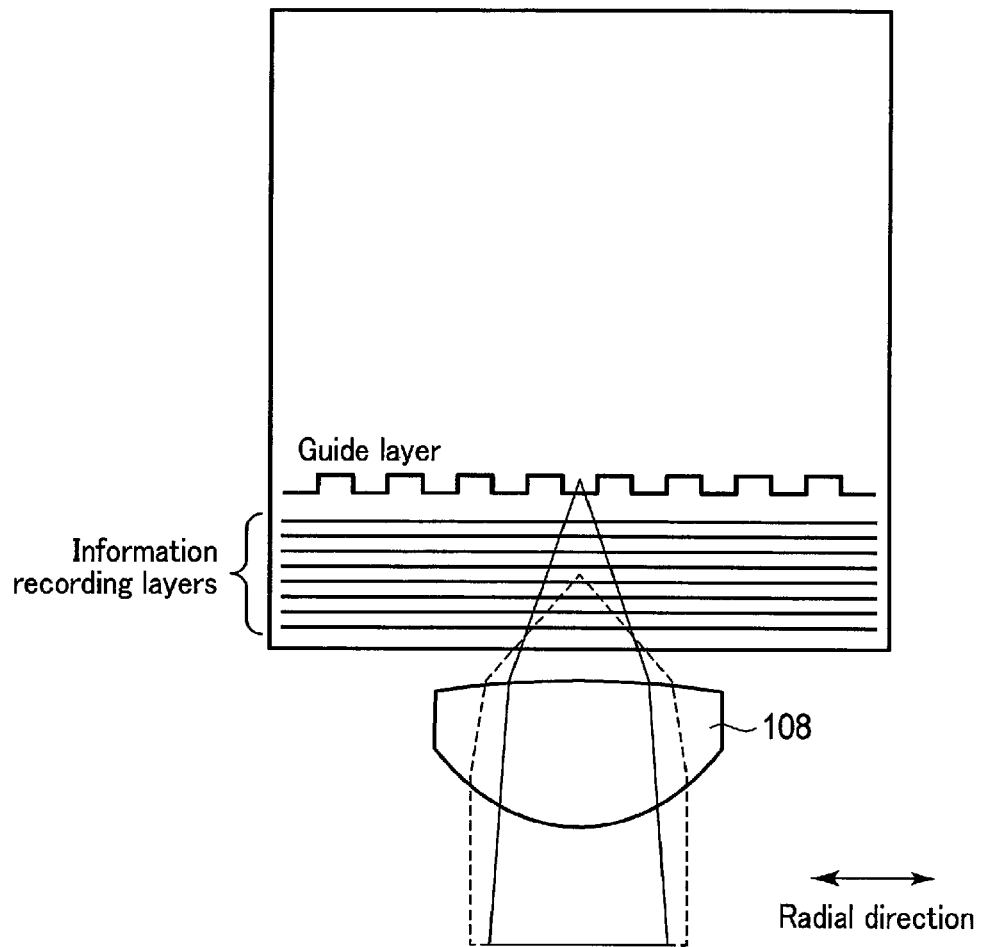
FIG. 2 shows an example of a cross section of an information recording medium of guide-layer-separated type.

As shown in FIG. 2, the information recording medium comprises a guide layer located on the back side as viewed in the light incidence direction, and a plurality of information recording layers located on the front side. As will be described later, the guide layer has a spiral track groove (namely, a guide track). The recording/reproducing apparatus shown in FIG. 1 comprises a disc drive mechanism (not shown), and this disc drive mechanism rotates the information recording medium at the time of information recording and reproduction.

The servo processing circuit 120 and the signal processing circuit 140 (which may be integrally formed as one circuit) are connected to a controller (not shown). The controller controls the servo processing circuit 120 and signal processing circuit 140 based on the instructions supplied from a higher-level information processing apparatus such as a computer.

The OPU 100 performs optical processing to record or reproduce information with reference to an information recording medium. More specifically, the OPU 100 can generate guide light for the guide layer (GL) and information recording light for the information recording layer (RL). The OPU 100 emits the generated light to the information recording medium. The OPU 100 receives the light returned from the information recording medium and supplies it to the servo processing circuit 120 as an electric signal. The OPU 100 can reproduce information recorded in the guide layer by using the guide light. The OPU 100 can record information in the information recording layer or reproduce information therefrom by using the information recording light. The OPU 100 is connected to an OPU drive mechanism (not shown). The OPU drive mechanism can move the OPU 100 in a radial direction of the information recording medium.

The OPU 100 comprises a red laser diode (LD) 101, a blue LD 102, a GL polarization beam splitter (PBS) 103-1, a GL collimator lens 103-2, a dichroic prism 103-3, a λ/4 wavelength plate 103-4, an RL PBS 103-5, an RL collimator lens 103-6, a GL focus correction mechanism 106, an RL aberration correction mechanism 107, an objective lens 108, an objective lens driving mechanism 109, a GL light-receiving element 110, an RL light-receiving element 111, a GL laser driving circuit 112, an RL laser driving circuit 113, a GL servo signal generation circuit 114, an RL servo signal generation circuit 115, an area-dividing diffraction grating 116, and an astigmatic optical system 117.

The LD 101 is a light source from which guide light is emitted. The wavelength of guide light is approximately 660 nm. Part of the guide light generated when the LD 101 is on is focused on a GL front monitor PD (not shown). The front monitor PD converts the focused guide light into an electric signal and supplies this electric signal to a power control circuit 121. The laser driving circuit 112 controls the intensity of the light generated by the LD 101, in accordance with a control signal supplied from the power control circuit 121 (to be described later).

The LD 102 is a light source from which information recording light is emitted. The wavelength of information recording light is approximately 405 nm. The laser driving circuit 113 controls the intensity of the light generated by the LD 102, in accordance with control signals supplied from a power control circuit 123 and a pulse modulation circuit 124. Part of the information recording light generated when the LD 102 is on is focused on an RL front monitor PD (not shown). The front monitor PD converts the focused information recording light into an electric signal and supplies this electric signal to a sample/hold (S/H) circuit 122.

Laser driving circuit 112 and laser driving circuit 113 can turn on LD 101 and LD 102 simultaneously. When information is recorded in the information recording layer, LD 101 and LD 102 have to be turned on simultaneously.

The guide light generated when LD 101 is on passes through the PBS 103-1. The guide light, which has passed through the PBS 103-1, is collimated by the collimator lens 103-2. A GL focus control circuit 125, which is to be described later, controls the focus correction mechanism 106 based on a focus error signal in order to move the collimator lens 103-2 in the optical axis direction. As a result, the beam spot of guide light is focused on a desirable position of the guide layer, as shown in FIG. 2.

The guide light substantially collimated by the collimator lens 103-2 is reflected by the dichroic prism 103-3. The guide light reflected by the dichroic prism 103-3 is transmitted through the λ/4 wavelength plate 103-4, by which the guide light is converted into circularly-polarized light. The guide light, which is circularly-polarized light, is incident on the objective lens 108 and is focused in the neighborhood of a desired guide layer portion of the information recording medium.

The guide light condensed in the neighborhood of the desired guide layer portion of the information recording medium is reflected by the guide layer. The guide light reflected by the guide layer enters the objective lens 108 again, by which it is substantially collimated. The guide light substantially collimated by the objective lens 108 is transmitted through the λ/4 wavelength plate 103-4, by which the guide light is converted into linearly-polarized light (the polarization direction of which is 90 degrees different from that of the guide light traveling toward the information recording medium).

The guide light, which is linearly-polarized light, is reflected by the dichroic prism 103-3, passes through the collimator lens 103-2, and is reflected by the PBS 103-1. The guide light reflected by the PBS 103-1 passes through both the area-dividing diffraction grating 116 and the astigmatic optical system 117, and is then incident on the light-receiving element 110. The light-receiving element 110 converts the incident light into an electric signal (the voltage of which is dependent on the amount of incident light) and supplies it to the servo signal generation circuit 114.

As will be described later, the servo signal generation circuit 114 performs operations for the input electric signal, thereby generating a focus error signal, a tracking error signal and a wobble reproduction signal. The servo signal generation circuit 114 supplies the focus error signal to the focus control circuit 125, supplies the tracking error signal to a tracking control circuit 126, and supplies the wobble reproduction signal to a preamplifier 127.

The information recording light generated when LD 102 is on passes through the PBS 103-5. The information recording light, which has passed through the PBS 103-5, is collimated by the collimator lens 103-6. The aberration correction mechanism 107 imparts spherical aberration to the information recording light passing through the collimator lens 103-6, based on a control signal supplied from an aberration control circuit 134 (described later), thereby correcting the spherical aberration (the degree of spherical aberration is dependent on the depth of a desired information recording layer).

The information recording light substantially collimated by the collimator lens 103-6 passes through the dichroic prism 103-3. The information recording light having passed through the dichroic prism 103-3 is transmitted through the λ/4 wavelength plate 103-4, by which the information recording light is converted into circularly-polarized light. The information recording light, which is circularly-polarized light, is incident on the objective lens 108 and is condensed in the neighborhood of a desired information recording layer of the information recording medium.

The information recording light condensed in the neighborhood of the desired information recording layer of the information recording medium is reflected by the information recording layer. The information recording light reflected by the information recording layer (namely, return light) enters the objective lens 108 again, by which it is substantially collimated. The information recording light substantially collimated by the objective lens 108 is transmitted through the λ/4 wavelength plate 103-4, by which the information recording light is converted into linearly-polarized light (the polarization direction of which is 90 degrees different from that of the information recording light traveling toward the information recording medium).

The information recording light, which is linearly-polarized light, is transmitted through the dichroic prism 103-3, passes through the collimator lens 103-6, and is reflected by the PBS 103-5. The information recording light reflected by the PBS 103-5 is incident on the light-receiving element 111. The light-receiving element 111 converts the incident light into an electric signal (the voltage of which is dependent on the amount of incident light) and supplies it to the servo signal generation circuit 115.

The servo signal generation circuit 115 performs an operation for the input electric signal, based on the knife-edge method, the astigmatic method or the like, thereby generating a focus error signal. The servo signal generation circuit 115 supplies the focus error signal to the focus control circuit 129. The servo signal generation circuit 115 performs an operation for the input electric signal, based on the differential phase detection (DPD) method, thereby generating a tracking error signal. The servo signal generation circuit 115 supplies the tracking error signal to a tracking control circuit 130.

The objective lens 108, driven by the objective lens driving mechanism 109, is moved in the optical axis direction for focus control, or is moved in a radial direction (i.e., a direction perpendicular to the line tangential to the guide groove) for tracking control. The NA of the objective lens 108 is 0.65, for example.

When information is recorded in the information recording medium, the tracking control circuit 126 controls the objective lens driving mechanism 109 based on the tracking error signal, in order to move the objective lens in the radial direction. As a result, the beam spot of guide light tracks a desirable track of the guide layer, as shown in FIG. 2.

Since the radius position of the beam spot of the information recording light moves in accordance with the movements of the OPU 100 and the objective lens driving mechanism 109, it is subjected to tracking control together with the radius position of the beam spot of the guide light. The beam spot of the information recording light is moved to a desired recording start position in accordance with the address information reproduced from the guide layer. Then, the intensity of the information recording light (namely, the recording intensity) is subjected to pulse modulation by the pulse modulation circuit 124, and desired information is recorded in the information recording layer.

The focus control circuit 129 controls the objective lens driving mechanism 109 based on a focus error signal in order to move the objective lens 108 in the optical axis direction. As a result, the beam spot of the information recording light is focused on a desirable information recording layer, as shown in FIG. 2.

When information is reproduced from the information recording medium, the tracking control circuit 130 controls the objective lens driving mechanism 109 based on the tracking error signal, in order to move the objective lens 108 in the radial direction. As a result, the beam spot of the information recording light tracks a desirable track of the information recording layer, as shown in FIG. 2.

The servo processing circuit 120 receives various electric signals from the OPU 100 and the signal processing circuit 140 and generates various control signals for the tracking servo and for the recording and reproduction based on the electric signals. The control signals are supplied to the OPU 100.

The servo processing circuit 120 comprises: a GL power control circuit 121, a sample/hold circuit 122, an RL power control circuit 123, a pulse modulation circuit 124, a GL focus control circuit 125, a GL tracking control circuit 126, a GL preamplifier 127, an analog-to-digital converter (A/D) 128, an RL focus control circuit 129, an RL tracking control circuit 130, an RL preamplifier 131, an A/D 132 and an RL aberration control circuit 134.

The power control circuit 121 receives an electric signal from the front monitor (GL). The power control circuit 121 generates a control signal used for causing the input electric signal to be close to a desired value, and supplies the control signal to the laser driving circuit 112 for feedback.

The sample/hold circuit 122 is subjected to timing control based on a control signal supplied from the pulse modulation circuit 124. The sample/hold circuit 122 samples and holds the electric signal supplied from the front monitor (RL) and supplies the resultant signal to the power control circuit 123.

The power control circuit 123 receives the electric signal from the sample/hold circuit 122. The power control circuit 123 generates a control signal used for causing the input electric signal to be close to a desired value, and supplies the control signal to the laser driving circuit 113 for feedback.

When information is recorded, the pulse modulation circuit 124 receives a reference clock signal from a clock generator 141 (described later) and further receives a recording signal (e.g., non-return-to-zero-inversion (NRZI) signal) from a signal processor 143. Based on the reference clock signal and the recording signal, the pulse modulation circuit 124 generates a control signal and supplies it to the laser driving circuit 113 and the sample/hold circuit 122. As a result, the laser intensity of the LD 102 is modulated to be like a pulsed signal. For example, the laser intensity of the LD 102 is high at the portion corresponding to "1" of recording data, and at the portion corresponding to "0" of the recording data, the LD 102 is turned off.

The focus control circuit 125 receives a focus error signal from the servo signal generation circuit 114. The focus control circuit 125 controls the focus correction mechanism 106 based on the focus error signal in order to move the collimator lens 103-2 in the optical axis direction.

The tracking control circuit 126 receives a tracking error signal from the servo signal generation circuit 114 when information is recorded in the information recording medium. The tracking control circuit 126 controls the objective lens driving mechanism 109 based on the tracking error signal, in order to move the objective lens 108 in the radial direction. The tracking control circuit 126 may control the OPU driving mechanism based on the tracking error signal, in order to move the OPU 100 in the radial direction.

Preamplifier 127 receives a wobble reproduction signal from the servo signal generation circuit 114. Preamplifier 127 adjusts the amplitude of the input electric signal in accordance with the gain, and supplies the adjusted electric signal to A/D 128. The A/D 128 receives this signal from preamplifier 127 and performs analog-to-digital conversion. The signal obtained thereby is supplied to the signal processing circuit 140.

The focus control circuit 129 receives a focus error signal from the servo signal generation circuit 115. The focus control circuit 129 controls the objective lens driving mechanism 109 based on the focus error signal in order to move the objective lens 108 in the optical axis direction.

The tracking control circuit 130 receives a tracking error signal from the servo signal generation circuit 115 when information is recorded in the information recording medium. The tracking control circuit 130 controls the objective lens driving mechanism 109 based on the tracking error signal, in order to move the objective lens 108 in the radial direction. The tracking control circuit 130 may control the OPU driving mechanism based on the tracking error signal, in order to move the OPU 100 in the radial direction.

Preamplifier 131 receives an electric signal from the servo signal generation circuit 115. The preamplifier 131 adjusts the amplitude of the input electric signal in accordance with the gain, and supplies the adjusted electric signal to A/D 132. The A/D 132 receives this signal from the preamplifier 131 and performs analog-to-digital conversion. The signal obtained thereby is supplied to the signal processing circuit 140.

The aberration control circuit 134 receives aberration error data from an aberration error calculator 145 (described later) and generates a control signal based on the aberration error data. The aberration control circuit 134 supplies the control signal to the aberration correction mechanism 107.

The signal processing circuit 140 processes a reproduction signal reproduced from the image recording medium and generates a recording signal to be recorded in the information recording medium. The signal processing circuit 140 controls the servo processing circuit 120 by supplying control signals to the respective elements of the servo processing circuit 120. The signal processing circuit 140 comprises a clock generator 141, an address processor 142, a signal processor 143 and an RL aberration error calculator 145.

The clock generator 141 generates a reference clock signal and supplies it to the pulse modulation circuit 124. The address processor 142 performs processing related to address information, such as the reproduction of address information. The reproduced address information is supplied to the higher-level information processing apparatus.

The signal processor 143 includes a reproduction signal processor (not shown) and a recording signal processor (not shown).

The recording signal processor receives target data from the higher-level information processing apparatus and converts the target data into data sequences that can be recorded in the information recording medium. To be more specific, the recording signal processor performs scrambling processing for the target data so that the data patterns are randomized, performs error correcting encoding (e.g., Reed-Solomon encoding or LDPC encoding) for the correction of errors, or performs interleave processing to deal with a series of errors. Furthermore, the recording signal processor adds sector address numbers (corresponding to the address information of data) to the target data, and further adds burst detection sub codes for the detection of burst errors. The recording signal processor performs 17PP modulation or ETM for the target data, and also performs NRZI conversion for the resultant data. As a result, data sequences that can be recorded in the information recording medium are obtained.

The reproduction signal processor receives reproduction signals from A/D 128 and A/D 132 and performs various kinds of filtering, such as adaptive filtering for suppressing non-linear noise components. In addition, the reproduction signal processor recovers the target data by performing, for the reproduction signals, the demodulation corresponding to the run length-restricting modulation and error correcting decoding corresponding to the error correcting encoding.

The recovered target data is supplied to the higher-level information processing apparatus.

The aberration error calculator 145 receives a digital signal from A/D 132 and calculates an aberration correction amount based on the digital signal. The aberration error calculator 145 supplies the aberration error data to the aberration control circuit 134.

As described above, the guide light reflected by the PBS 103-1 is incident on the area-dividing diffraction grating 116. The area-dividing diffraction grating 116 divides the incident beam into portions in accordance with a plurality of areas that are defined in a plane perpendicular to the optical axis. The area-dividing diffraction grating 116 is provided with a plurality of diffraction grating elements corresponding to the areas. The characteristics (e.g., the direction, curvature, pitch, groove depth, and diffraction efficiency ratio) of the diffraction grating elements are made different from one another, thereby enabling division of the incident beam.

Figure 3:
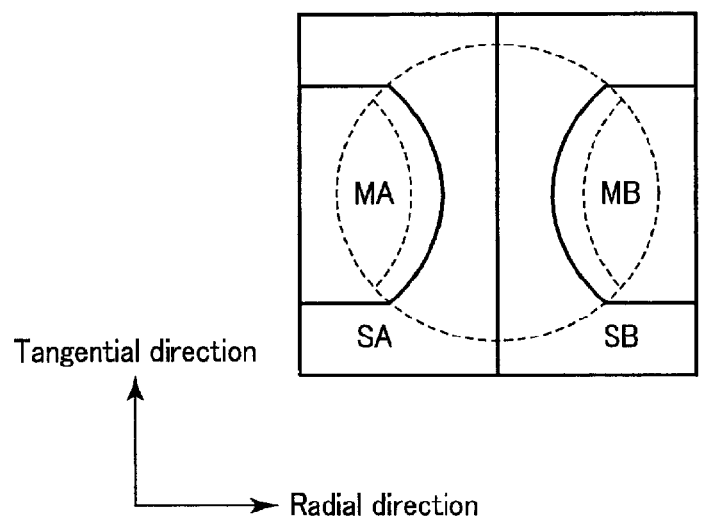
FIG. 3 shows an example of how an area separation pattern of an area-dividing diffraction grating is in the recording/reproducing apparatus of the first embodiment.

The area-dividing diffraction grating 116 may divide an incident beam in accordance with the area-dividing pattern shown for example in FIG. 3. In FIG. 3, the solid lines indicate boundaries between the areas. In FIG. 3, the broken lines indicate (i) a cross sectional shape of a guide beam passing through the area-dividing diffraction grating 116 and (ii) a baseball pattern caused by the interference between the zero-order beam and the positive and negative first-order beam, which are included in the guide light diffracted by the guide groove of the guide layer.

In the area-dividing pattern shown in FIG. 3, area MA includes an interference area caused by the zero-order beam and the positive and negative first-order beams, which are diffracted by the guide groove of the guide layer. Likewise, area MB includes an interference area caused by the zero-order beam and the positive and negative first-order beams. The area other than areas MA and MB is divided by a dividing line into area SA and area SB. The dividing line passes through the center of the optical axis of the guide light and is substantially parallel to the tangential direction.

In the present embodiment, the area-dividing diffraction grating 116 is arranged such that the diffraction efficiency ratio of the zero-order beam to the positive and negative first-order beams is 1:9 in each of area MA, area MB, area SA and area SB. The diffraction efficiency ratio may differ depending upon the areas.

After passing through the area-dividing diffraction grating 116, the zero-order beam and the positive and negative first-order beams are provided with astigmatism by the astigmatic optical system 117. Then, the zero-order beam and the positive and negative first-order beams are incident on the light-receiving element 110.

Figure 4:
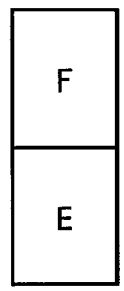
FIG. 4 shows an example of a photodetector (PD) cell pattern of a light-receiving element for a guide layer, depicted in FIG. 1.
Figure 4:
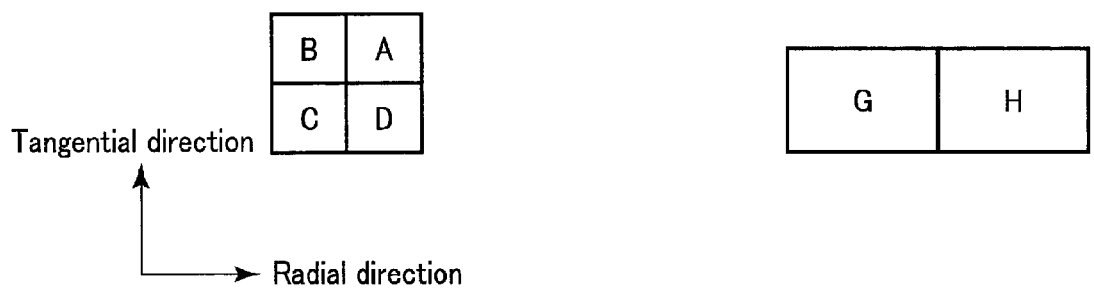

As shown in FIG. 4, the light-receiving element 110 includes a plurality of PD cells. An FES PD cell group, formed by PD cell A, PD cell B, PD cell C and PD cell D, generates an electric signal used for calculating a focus error signal. On the other hand, an MPP PD cell group, formed by PD cell E and PD cell F, generates an electric signal used for calculating a tracking error signal. An SPP PD cell group, formed by PD cell G and PD cell H, generates an electric signal used for calculating a sub tracking signal (described later).

The zero-order beam having passed through the astigmatic optical system 117 is incident on the FES PD cell group. The FES PD cell group is located within the least confusion circle caused by the astigmatism of the astigmatic optical system 117. The shape of the zero-order beam incident on the FES PD cell group is determined depending on the distance between the objective lens 108 and the information recording medium, and changes in such a way as is shown in FIGS. 5A, 5B, 5C, 5D, 5E, 5F and 5G.

Figure 5A:
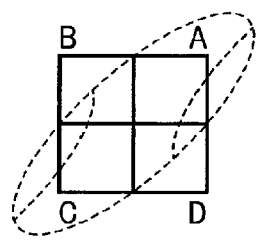
FIG. 5A shows an example of a shape of a zero-order optical beam which is incident on an FES PD cell group in the recording/reproducing apparatus of the first embodiment.
Figure 5B:
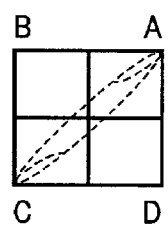
FIG. 5B shows an example of a shape of a zero-order optical beam which is incident on the FES PD cell group in the recording/reproducing apparatus of the first embodiment.
Figure 5C:
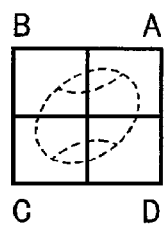
FIG. 5C shows an example of a shape of a zero-order optical beam which is incident on the FES PD cell group in the recording/reproducing apparatus of the first embodiment.
Figure 5D:
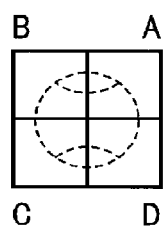
FIG. 5D shows an example of a shape of a zero-order optical beam which is incident on the FES PD cell group in the recording/reproducing apparatus of the first embodiment.
Figure 5E:
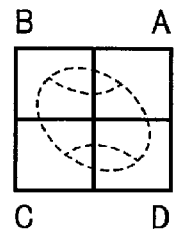
FIG. 5E shows an example of a shape of a zero-order optical beam which is incident on the FES PD cell group in the recording/reproducing apparatus of the first embodiment.
Figure 5F:
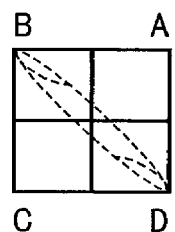
FIG. 5F shows an example of a shape of a zero-order optical beam which is incident on the FES PD cell group in the recording/reproducing apparatus of the first embodiment.
Figure 5G:
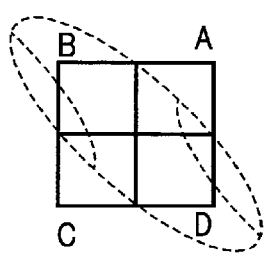
FIG. 5G shows an example of a shape of a zero-order optical beam which is incident on the FES PD cell group in the recording/reproducing apparatus of the first embodiment.
Figure 7:
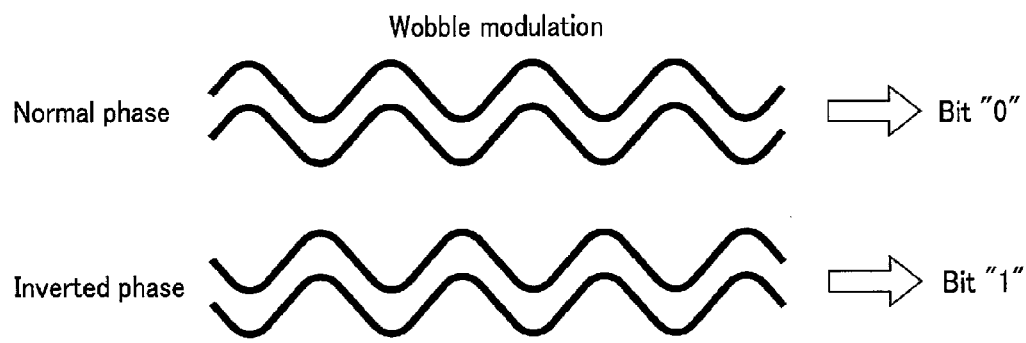
FIG. 7 is an explanatory diagram illustrating wobble phase modulation.

To be more specific, when the distance is proper (i.e., the beam spot of the guide light is focused on a desired guide layer portion), the shape of the zero-order beam is substantially circular, as shown in FIG. 5D. When the distance is longer or shorter than the proper distance, the shape of the zero-order beam is ellipsoidal and is slanted with reference to the tangential direction and the radial direction, as shown in FIGS. 5A and 5G.

The servo signal generation circuit 114 utilizes the relation between the distance and the shape of the zero-order beam and generates a focus error signal based on the astigmatic method. To be more specific, the servo signal generation circuit 114 receives from the light-receiving element 111 electric signals used for calculating a focus error signal. The electric signals are obtained by supplying the currents which the PD cells of the FES PD cell group generate in accordance with the amounts of incident light to an I/V amplifier (not shown), for I/V conversion. Let us assume that Va is the voltage of an electric signal supplied from PD cell A, Vb is the voltage of an electric signal supplied from PD cell B, Vc is the voltage of an electric signal supplied from PD cell C, and Vd is the voltage of an electric signal supplied from PD cell D. In this case, the servo signal generation circuit 114 can generate a focus error signal (FES) by executing the calculation shown in formula (1) below.

$$FES=(Va+Vc)-(Vb+Vd) \qquad (1)$$

FES is substantially zero when the shape of the zero-order beam is substantially circular, as shown in FIG. 5D. FES takes a negative value or positive value whose absolute value increases when the shape of the zero-order beam is distorted more.

One of the positive and negative first-order beams having passed through the astigmatic optical system 117 is incident on the MPP PD cell group and the SPP PD cell group. The area-dividing diffraction grating 116 imparts astigmatism to the positive and negative first-order beams in such a manner that the astigmatism imparted to either the positive first-order beam or the negative first-order beam by the astigmatic optical system 117 is canceled. As a result, the positive first-order beam forms a small spot on the PD cells when it is condensed on the PD cells, while the negative first-order beam does not form a small spot on the PD cells and are hard to receive. In the description below, therefore, it is assumed that the positive first-order beam is used to generate various servo signals, although the negative first-order beam may be used to generate the servo signals. Whether the positive first-order beam or the negative first-order beam is used in each of the areas can be determined by properly controlling the astigmatism imparted by the diffraction grating elements corresponding to the respective areas.

To be more specific, the positive first-order beam having passed through area MA of the area-dividing pattern of the area-dividing diffraction grating 116 is incident on PD cell E, the positive first-order beam having passed through area MB is incident on PD cell F, the positive and negative first-order beams having passed through area SA is incident on PD cell G, and the positive first-order beam having passed through area SB is incident on PD cell H.

As described above, area MA and area MB include an interference area caused by the zero-order beam and the positive and negative first-order beams. Therefore, a push-pull signal can be obtained based on the light amount difference between the areas. To be more specific, the servo signal generation circuit 114 receives from the light-receiving element 111 electric signals used for calculating a main push-pull signal (used as a tracking error signal). The electric signals are obtained by supplying the currents which the PD cells of the MPP PD cell group generate in accordance with the amounts of incident light to an I/V amplifier (not shown), for I/V conversion. Let us assume that Ve is the voltage of an electric signal supplied from PD cell E and Vf is the voltage of an electric signal supplied from PD cell F. In this case, the servo signal generation circuit 114 can generate a main push-pull signal (MPP) by executing the calculation shown in formula (2) below.

$$MPP=Ve-Vf \tag{2}$$

The offset component of the main push-pull signal varies when the objective lens 108 is driven in the radial direction. The servo signal generation circuit 114 may further generate a sub tracking signal for compensating for the variation of the offset component, based on the light amount difference between area SA and area SB, which do not include the interference area. To be more specific, the servo signal generation circuit 114 receives from the light-receiving element 111 electric signals used for calculating a sub push-pull signal (used as a sub tracking signal). The electric signals are obtained by supplying the currents which the PD cells of the SPP PD cell group generate in accordance with the amounts of incident light to an I/V amplifier (not shown), for I/V conversion. Let us assume that Vg is the voltage of an electric signal supplied from PD cell G and Vh is the voltage of an electric signal supplied from PD cell H. In this case, the servo signal generation circuit 114 can generate a sub push-pull signal (SPP) by executing the calculation shown in formula (3) below.

$$SPP=Vg-Vh \tag{3}$$

The servo signal generation circuit 114 can generate a compensated push-pull signal (CPP) by executing the calculation shown in formula (4) below.

$$CPP=MPP-k1\times SPP \tag{4}$$

where k1 is a positive constant. SPP does not include a push-pull signal component based on the light amount difference between the positive and negative first-order beams but includes an offset component based on a shift amount of the objective lens 108. Therefore, the offset component can be canceled and the push-pull signal component is prevented from decreasing, by adjusting the amplitude of SPP by k1 and subtracting the adjusted SPP from MPP.

The servo signal generation circuit 114 has to generate a wobble reproduction signal in order to reproduce management information (e.g., address information) recorded in the guide layer. As described above, a spiral guide track is formed in the guide layer. To be more specific, a depression (a groove) is formed in the land of the guide layer, as shown in FIG. 6. The depth of the groove is 60 nm, for example. The groove is formed in such a manner that the radially adjacent portions of the groove are shifted from each other by half the distance between the centers of the radially adjacent portions (one of the adjacent portions is shifted inward or outward of the other). Therefore, the guide track has a single spiral structure wherein the groove and the land alternate each time the information recording medium makes one rotation.

The groove is formed to wind since it is subjected to wobble modulation or width modulation (by which the width of the groove is varied) based on the address information to be recorded. The standard value of the amplitude of the winding of the groove is 20 nm, for example. For example, in the wobble modulation, the groove is formed to be similar to a sinusoidal waveform, which winds in the radial direction. Address information is expressed by modulating the phase, frequency or amplitude of the sinusoidal waveform.

The guide layer shown in FIG. 6 is based on the land and groove tracking system, wherein both a land track and a groove track are the objects of tracking. In the land and groove tracking system, the distance between the adjacent data tracks of the information recording medium is the same as the distance between the land and the groove of the guide layer. In other words, the distance between the adjacent data tracks is equal to half the distance between the adjacent groove portions of the guide layer, which is a physical pitch of the guide layer. For example, the adjacent groove portions are at intervals of 0.64 µm, while the data tracks are at intervals of 0.32 µm. With this structure, the land and groove tracking system enables an information recording layer to record information at high recording density.

In the single spiral structure, the land and the groove are alternately tracked, and what is tracked switches from one to the other at a land/groove switch position. In the guide layer shown in FIG. 6, the land/groove switch position is provided for each turn of the track. That is, the recording/reproducing apparatus switches between tracking a groove and tracking a land each time the information recording medium makes one rotation. In other words, each of the groove tracks is sandwiched between two land tracks, and each of the land tracks is sandwiched between two groove tracks. When information is reproduced from the guide layer, a guide beam traces one spiral.

Figure 8:
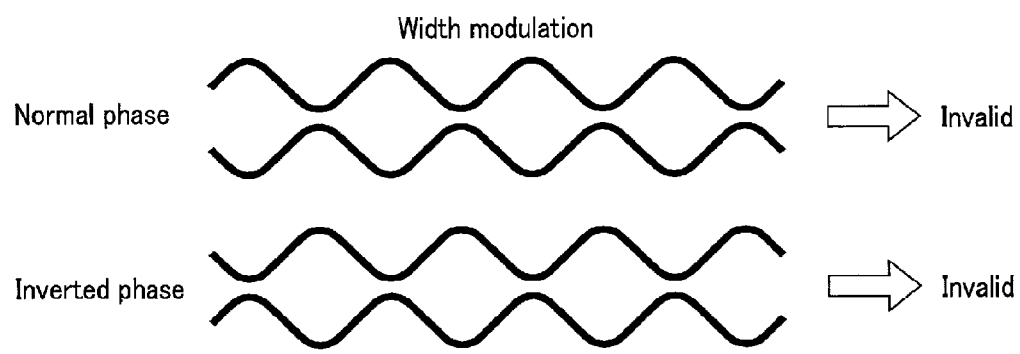
FIG. 8 is an explanatory diagram illustrating width modulation.

The data symbol used for recording address information in the guide layer is expressed, for example, as a 4-wave wobble. More specifically, a 4-wave wobble having a normal phase is a data symbol to which "0" is assigned. On the other hand, a 4-wave wobble having an inverted phase is a data symbol to which "1" is assigned. In order to form a desired wobble waveform on the land, the groove adjacent to the land may be subjected to width modulation. As shown in FIG. 8, however, no bit value is assigned to a width-modulated symbol.

Figure 9:
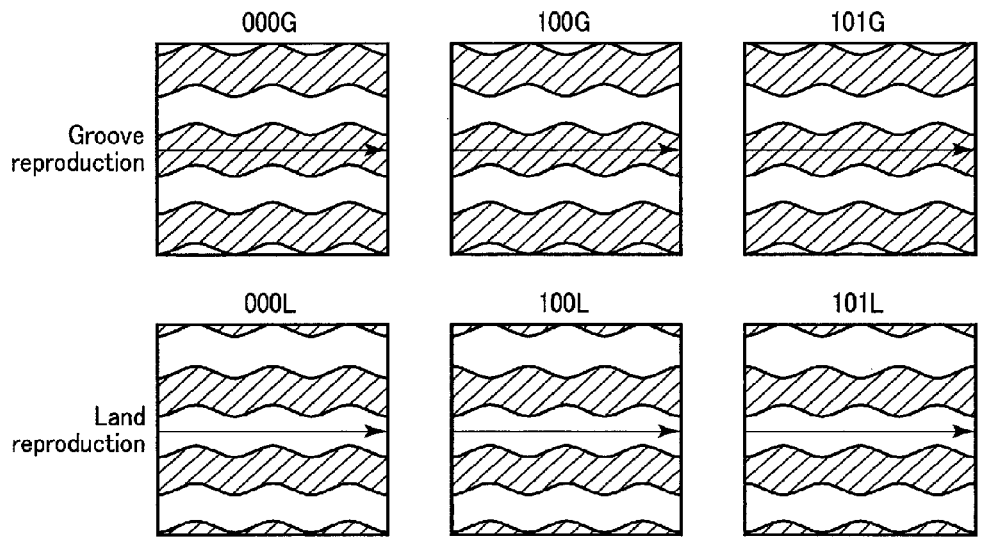
FIG. 9 shows examples of patterns of a guide track to be reproduced and its neighboring guide tracks.

The wobbles formed in the guide track (namely, a groove track and a land track) are reproduced by the optical system of the recording/reproducing apparatus, and a wobble reproduction signal is electrically generated. In relation to the size of a beam spot and the track pitch, the wobble reproduction signal may be under the effect of not only the wobbles of the guide track to be reproduced but also the wobbles of the neighboring guide tracks. The combinations of the guide track to be reproduced and the neighboring guide tracks can be represented by the patterns shown in FIG. 9.

Pattern 000G represents the case where both the phase of the wobble of an inwardly adjacent groove track and the phase of the wobble of an outwardly adjacent groove track are the same as the phase of the wobble of a groove track to be reproduced. In other words, the inwardly adjacent groove track, the groove track to be reproduced and the outwardly adjacent groove track have wobbles whose phase pattern is [000] or [111]. In the description below, a wobble having a normal phase will be mentioned as "0", a wobble having an inverted phase will be mentioned as "1."

Pattern 100G represents the case where the wobble of either an inwardly adjacent groove track or the wobble of an outwardly adjacent groove track is in phase with the wobble of a groove track to be reproduced and where the phase of the wobble of the remaining groove track is inverted from that of the wobble of the groove track to be reproduced. In other words, the inwardly adjacent groove track, the groove track to be reproduced and the outwardly adjacent groove track have wobbles whose phase pattern is [001], [100], [011] or [110].

Pattern 101G represents the case where both the phase of the wobble of an inwardly adjacent groove track and the phase of the wobble of an outwardly adjacent groove track are inverted from that of the wobble of a groove track to be reproduced. In other words, the inwardly adjacent groove track, the groove track to be reproduced and the outwardly adjacent groove track have wobbles whose phase pattern is [101] or [010].

Pattern 000L represents the case where both the phase of the wobble of an inwardly adjacent land track and the phase of the wobble of an outwardly adjacent land track are the same as the phase of the wobble of a land track to be reproduced. In other words, the inwardly adjacent land track, the land track to be reproduced and the outwardly adjacent land track have wobbles whose phase pattern is [000] or [111].

Pattern 100L represents the case where either the phase of the wobble of an inwardly adjacent land track or the phase of the wobble of an outwardly adjacent land track is the same as that of the wobble of a land track to be reproduced and where the phase of the wobble of the remaining land track is inverted from that of the wobble of the groove track to be reproduced. In other words, the inwardly adjacent land track, the land track to be reproduced and the outwardly adjacent land track have wobbles whose phase pattern is [001], [100], [011] or [110].

Pattern 101L represents the case where both the phase of the wobble of an inwardly adjacent land track and the phase of the wobble of an outwardly adjacent land track are inverted from that of the phase of the wobble of a land track to be reproduced. In other words, the inwardly adjacent land track, the land track to be reproduced and the outwardly adjacent land track have wobbles whose phase pattern is [101] or [010].

A wobble reproduction signal component is included in a push-pull signal as a high-frequency component. Therefore, the wobble reproduction signal can be extracted by applying a high-pass filter, which suppresses the frequency components of the servo signal band or lower bands, to the push-pull signal.

The wobble reproduction signal can be generated in various methods. For example, where a focus error signal is generated based on the astigmatic method, the zero-order beam and the positive and negative first-order beams received by the FES PD cell group are used. The zero-order beam and the positive and negative first-order beams are also used for calculating a push-pull signal, which is a tracking error signal. To be specific, the push-pull signal is calculated according to $(Va+Vb)-(Vc+Vd)$. The wobble reproduction signal (WBLc1) included in the push-pull signal can be generated according to formula (5) below.

$$WBLc1 = HFC\{(Va+Vb)-(Vc+Vd)\} \quad (5)$$

In the descriptions below, HFC(x) is a function of extracting the high-frequency components of x.

Instead of using the push-pull signal, the wobble reproduction signal (WBLc2) included in the main push-pull signal of formula (2) can be generated according to formula (6) below.

$$WBLc2 = HFC(MPP) \quad (6)$$

As will be described later, however, the wobble reproduction signal (WBLc1) according to the first comparative example and the wobble reproduction signal (WBLc2) according to the second comparative example have problems in that the amplitude may lower and the phase may be inverted when spherical aberration is generated. It is therefore desirable that the servo signal generation circuit 114 generate a wobble reproduction signal (WBL) represented in formula (7) set forth below.

$$WBL = HFC(MPP + k2 \times SPP) \quad (7)$$

where k2 is a positive constant. More specifically, k2 is a compensation coefficient for compensating for the diffraction efficiency differences of the areas of the area-dividing diffraction grating 116. As will be described later, this wobble reproduction signal (WBL) enables reduction of adverse effects which may be caused by spherical aberration (the lowering of amplitude and the inversion of phase).

Figure 10A:
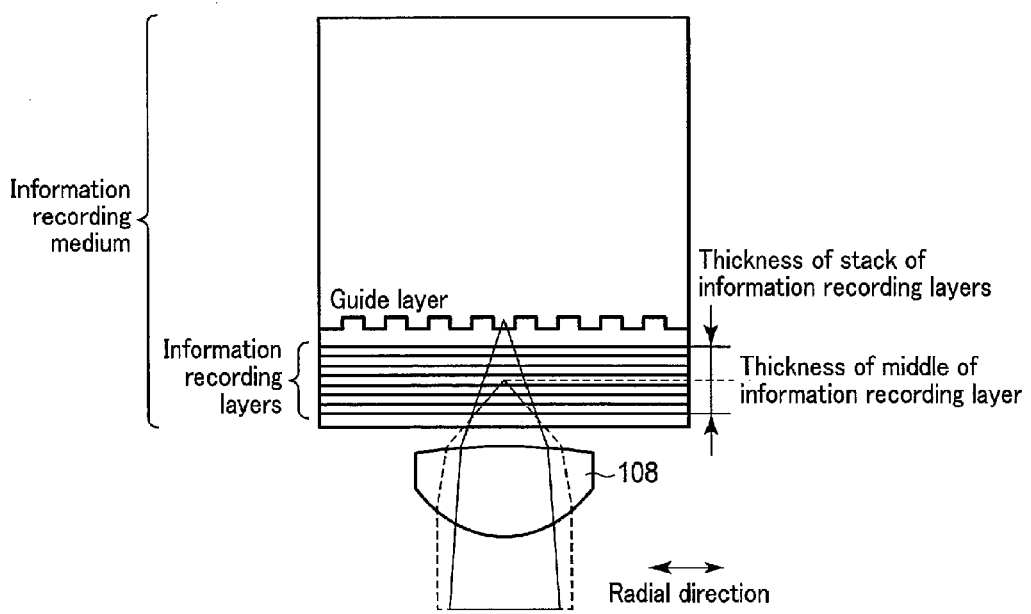
FIG. 10A illustrates an example of how spherical aberration is generated.

The amount of the spherical aberration of guide light is dependent on the depth at which information recording light is focused. As shown in FIG. 10A, when information is recorded, the guide light and the information recording are focused on the desired guide layer portion and desired information recording layer, respectively, by the objective lens 108. Typically, the optical characteristics of the objective lens 108 are optimized in such a manner that the wave aberration is minimum when the information recording layer is focused at a specific depth (referred to as a design depth) in the information recording layer. If the design depth is in the neighborhood of the center of the information recording layer, the maximum value of the residual aberration decreases when the information recording light is focused on each information recording layer.

When the information recording light is focused at a depth different from the design depth, a biaxial actuator (serving as the objective lens driving mechanism 109) is controlled to move the objective lens 108 in the optical axis direction.

Figure 10B:
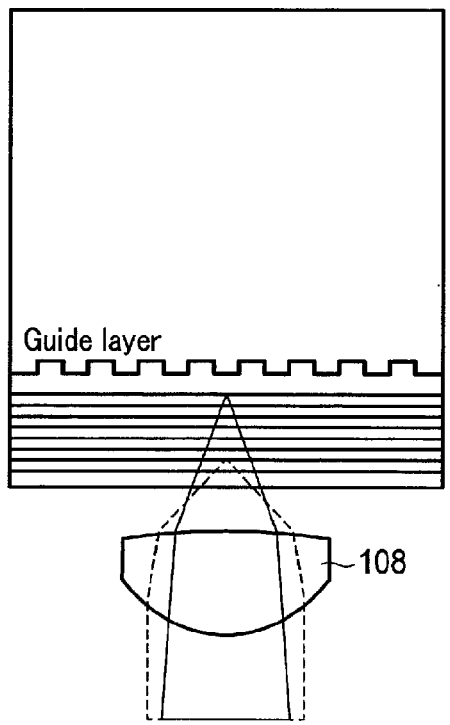
FIG. 10B illustrates an example of how spherical aberration is generated.

As shown in FIG. 10B, when the information recording light is focused on an information recording layer located at a shallower position than the design depth, the objective lens 108 is moved away from the information recording medium in the optical axis direction. In accordance with the movement of the objective lens 108, the focus position of the information recording light moves to the same depth as the desired information recording layer.

If the information recording light is focused on an information recording layer located at a position different from that of the design depth, spherical aberration is caused in the information recording light. The spherical aberration attributed to the position of the information recording layer can be canceled by the aberration correction mechanism 107 mentioned above. To be specific, when the aberration correction mechanism 107 drives the collimator lens 103-6 in the optical axis direction, the image formation magnification of the objective lens 108 changes, causing spherical aberration. The aberration correction mechanism 107 adjusts the spherical aberration caused by the change in the image formation magnification such that the adjusted spherical aberration becomes equal to the spherical aberration caused by the position of the information recording layer but is opposite in sign. By so doing, the spherical aberration caused by the position of the information recording layer can be canceled. As a result, the residual aberration can be reduced and does not cause any problem in practice.

Figure 10C:
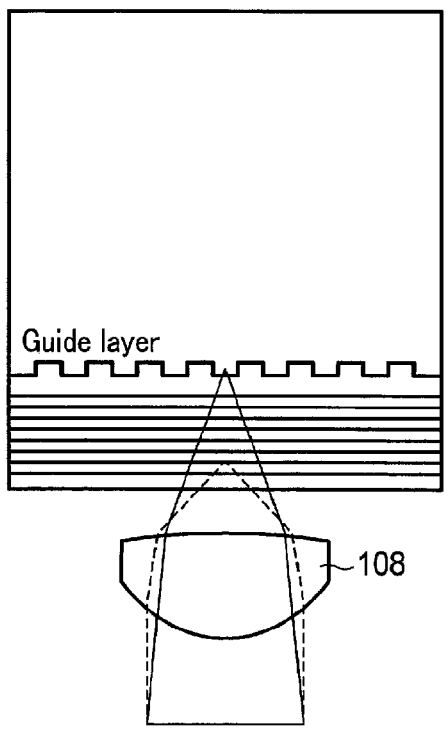
FIG. 10C illustrates an example of how spherical aberration is generated.

When the objective lens 108 moves away from the information recording medium in the optical axis direction, the guide light is focused at a position shallower than the desired guide layer portion, as shown in FIG. 10B. Therefore, the focus correction mechanism 106 moves the collimator lens 103-2 in the optical axis direction, thereby moving the focus position of the guide light to the desired guide layer portion, as shown in FIG. 10C.

Figure 11:
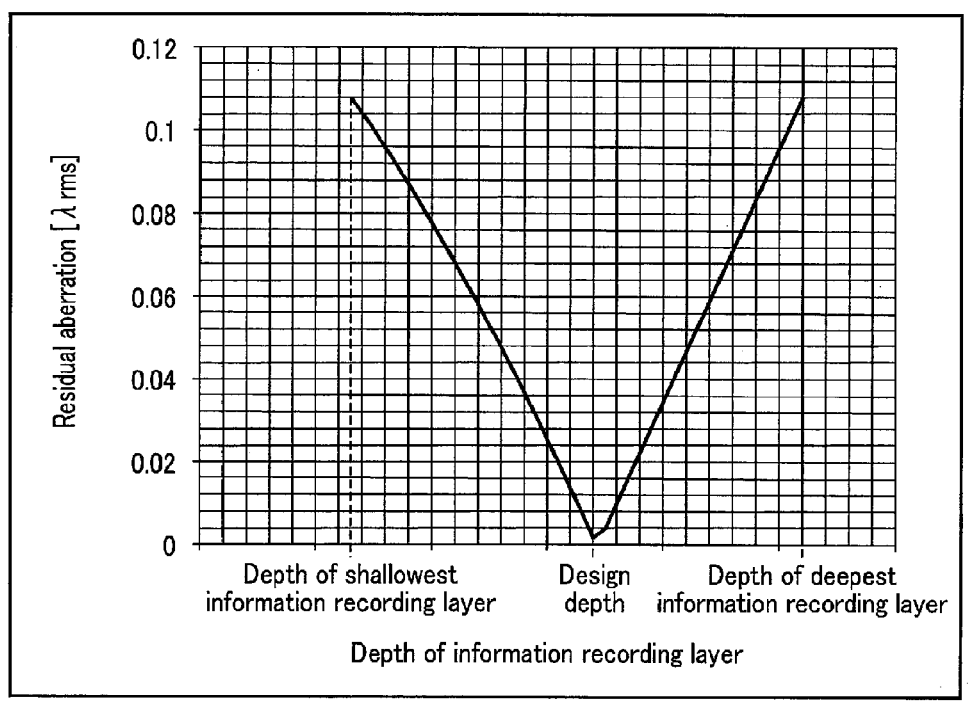
FIG. 11 is a graph showing an example of a relationship between the depth at which information recording light is focused and the residual aberration of guide light.

The spherical aberration caused by the focus correction of the guide light is not canceled, and remains in the manner shown in FIG. 11. In FIG. 11, the ordinate axis represents residual aberration of the guide light, while the abscissa axis represents the depth of an information recording layer at which information recording light is focused. The residual aberration shown in FIG. 11 is measured after the objective lens 108 and the aberration correction mechanism 107 minimize the residual aberration with respect to information recording light and the focus correction mechanism 106 minimizes the residual aberration with respect to guide light.

When the information recording light is focused at the design depth, the residual aberration of guide light is not more than 0.01 rms. However, the residual aberration of the guide light increases in accordance with an increase in the distance by which the focus position of the information recording light is away from the design depth. In the example shown in FIG. 11, when the information recording light is focused in the information recording layer located at the shallowest position or when it is focused in the information recording layer located at the deepest position, the residual aberration of the guide light exceeds 0.07 λrms, which is a Marechal's criterion. Since the depth range of the information recording layer increases in accordance with an increase in the number of layers included therein, the maximum value of the residual aberration of the guide light also increases.

FIGS. 12A, 12B, 13A, 13B, 14A and 14B show simulation results representing how the defocus margin of the wobble reproduction signal of the first comparative example (WBLc1), that of the wobble reproduction signal of the second comparative example (WBLc2) and that of the preferred wobble reproduction signal (WBL) are when no spherical aberration is generated (aberration amount=0 λrms) and when spherical aberration is generated (aberration amount=0.12 rms).

In each of FIGS. 12A, 12B, 13A, 13B, 14A and 14B, the ordinate axis represents the amplitude of a wobble reproduction signal, while the abscissa axis represents a defocus amount. The defocus amount is a relative distance between the information recording medium and the objective lens 108, and the distance permitting the amplitude of the push-pull signal to become maximum is used as a reference when the relative distance is expressed.

The defocus margin means the range of defocus in which the amplitude of a wobble reproduction signal is not less than a threshold amplitude. As long as the defocus is within the defocus margin, the reproduction of address information can be expected. When the amplitude of a wobble reproduction signal is negative, this means that the phase of the wobble reproduction signal is inverted.

As shown in FIGS. 12A, 13A and 14A, when no spherical aberration is generated, the defocus margin of the wobble reproduction signal of the first comparative example (WBLc1), that of the wobble reproduction signal of the second comparative example (WBLc2) and that of the preferred wobble reproduction signal (WBL) are not less than 3 μm p-p (peak-to-peak) with respect to pattern 000G, pattern 100G and pattern 101G.

As shown in FIGS. 12B and 13B, however, when spherical aberration is generated, the amplitude of the wobble reproduction signal of the first comparative example (WBLc1) and that of the wobble reproduction signal of the second comparative example (WBLc2) are negative values (i.e., the phases are inverted) even when the defocus is zero, at least with respect to pattern 100G and pattern 101G. In this case, address information is hard to reproduce.

As shown in FIG. 14B, when spherical aberration is generated, the defocus margin of the preferred wobble reproduction signal is not less than 4 μm p-p with respect to pattern 000G, pattern 100G and pattern 101G.

As shown in FIGS. 12A, 12B, 13A, 13B, 14A and 14B, the wobble reproduction signals are hardly affected by spherical aberration with respect to pattern 000G. The wobble reproduction signal of the first comparative example (WBLc1) and the wobble reproduction signal of the second comparative example (WBLc2) have their amplitudes lowered and their phases inverted, with respect to pattern 100G and pattern 101G. As can be seen from the above, when spherical aberration is generated, there is a wobble phase pattern (000G) in which the amplitude of a wobble reproduction signal is hard to lower, and there are wobble phase patterns (100G and 101G) in which the amplitude of a wobble reproduction signal is easy to lower.

In the case of pattern 000G, the groove pitch does not vary in the vicinity of the converging spot of the guide light. In the case of patterns 100G and 101G, the groove pitch varies substantially in the vicinity of the converging spot of the guide light.

In particular, when the groove pitch increases, the overlap between the passage region of the positive and negative first-order beam and the areas SA and SB shown in FIG. 3 increases. Furthermore, since the guide light forms a large spot on the guide layer when the spherical aberration is large, the influence caused by the neighboring groove tracks increases. Since the wobble reproduction signal of the second comparative example (WBLc2) does not reflect the light amount in area SA or SB, the amplitude of the wobble reproduction signal is likely to lower when spherical aberration is generated.

The wobble reproduction signal of the first comparative example (WBLc1) reflects the light amount in the center of the beam. When spherical aberration is generated, however, the focal length differs between the center portion of the beam and the circumferential portion thereof. For example, even if the circumferential portion of the beam is a least confusion circle, the center portion of that beam may defocus greatly. In addition, the shape of the beam spot formed by the return beam incident on the FES PD cell group is deformed greatly due to the astigmatism imparted by the astigmatic optical system located in the preceding stage of the FES PD cell group. In other words, when spherical aberration is generated, the center portion of the beam is not divided along a dividing line passing through the optical axis of the guide light and substantially parallel to the tangential direction or the radial direction. Since the wobble reproduction signal of the first comparative example (WBLc1) cannot adequately reflect the light amount in the center portion of the beam when spherical aberration is generated, the wobble reproduction signal cannot have a proper amplitude.

As described above, the recording/reproducing apparatus of the first embodiment first divides a return beam from the guide layer by the area-dividing diffraction grating having a plurality of areas defined in a plane perpendicular to the optical axis, and then imparts astigmatism to the divided beams by the astigmatic optical system. The plurality of areas include an area through which a beam required for the calculation of a main push-pull signal passes, and an area through which a beam required for the calculation of a sub push-pull signal passes. The recording/reproducing apparatus calculates a wobble reproduction signal using the main push-pull signal and the sub push-pull signal. Therefore, even if major spherical aberration is generated, the amplitude of the wobble reproduction signal is prevented from lowering, and the recording/reproducing apparatus can stably read address information from the guide layer.

Second Embodiment

In general, a beam used for calculating a focus error signal based on the astigmatic method includes a push-pull signal component. If the beam spot of the guide light moves across a track, the amplitude of the push-pull signal may vary, and the variation may affect the focus error signal. As a result, the focus servo may become unstable. This problem is attributable to the fact that the position adjustment of the PD cells may not be complete and the fact that the actual intensity distribution of the beam may differ from an ideal distribution. These are unavoidable as long as the astigmatic method is adopted.

A recording/reproducing apparatus of the second embodiment can generate a stable focus error signal irrespective of the variations in the amplitude of a push-pull signal, by determining the characteristics of the diffraction grating elements of the area-dividing diffraction grating 116 of the recording/reproducing apparatus shown in FIG. 1 as follows:

For example, blazed diffraction gratings are employed as diffraction grating elements corresponding to areas MA and MB of the area dividing pattern shown in FIG. 3. The diffraction efficiency ratio of the blazed diffraction grating corresponding to area MA is, for example, (negative first-order):(zero-order):(positive first-order)=0:0:1. The diffraction efficiency ratio of the blazed diffraction grating corresponding to area MB is, for example, (negative first-order):(zero-order):(positive first-order)=0:0:1. Accordingly, the zero-order beam cannot pass through area MA or MB.

For example, binary diffraction gratings are employed as diffraction grating elements corresponding to areas SA and SB of the area dividing pattern shown in FIG. 3. The diffraction efficiency ratio of these binary diffraction grating is, for example, (negative first-order):(zero-order):(positive first-order)=0.4:0.2:0.4

Figure 15:
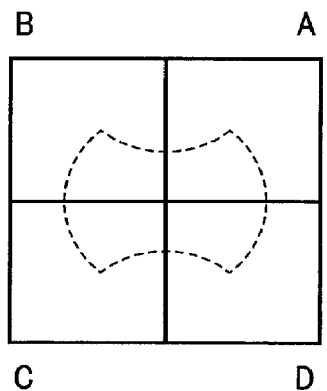
FIG. 15 shows an example of a shape of a zero-order optical beam which is incident on an FES PD cell group in the recording/reproducing apparatus of the second embodiment.

Since the zero-order beam cannot pass through area MA or MB, as mentioned above, the zero-order beam having such a shape as is shown in FIG. 15 is incident on the FES PD cell group. It should be noted that areas MA and MB are areas through which beams required for the calculation of main-push pull signals can pass. In other words, the zero-order beam incident on the FES PD cell group does not include a push-pull signal component. Accordingly, the servo signal generation circuit 114 can generate a focus error signal that does not include a push-pull signal component.

As described above, the recording/reproducing apparatus of the second embodiment does not allow the zero-order beam to pass through area MA or MB, which is an area through which a beam required for the calculation of a main push-pull signal passes. (Alternatively, the recording/reproducing apparatus of the second embodiment may reduce the amount of zero-order beam passing through areas MA and MB more than the amount of zero-order beam passing through the other areas (e.g., areas SA and SB)). Accordingly, the recording/reproducing apparatus of the second embodiment can generate a focus error signal that does not include a push-pull signal component, and stable focus servo is thus enabled.

Third Embodiment

As described above, when spherical aberration is generated, the focal length differs between the center portion of a beam and the circumferential portions of the beam. A focus error signal is generated using the entire beam. Therefore, a focus error signal generated when spherical aberration is generated corresponds to a superposition of components having mutually different focal lengths. When spherical aberration is generated, a focus error signal is distorted greatly, and the focus servo may be unstable.

Figure 17A:
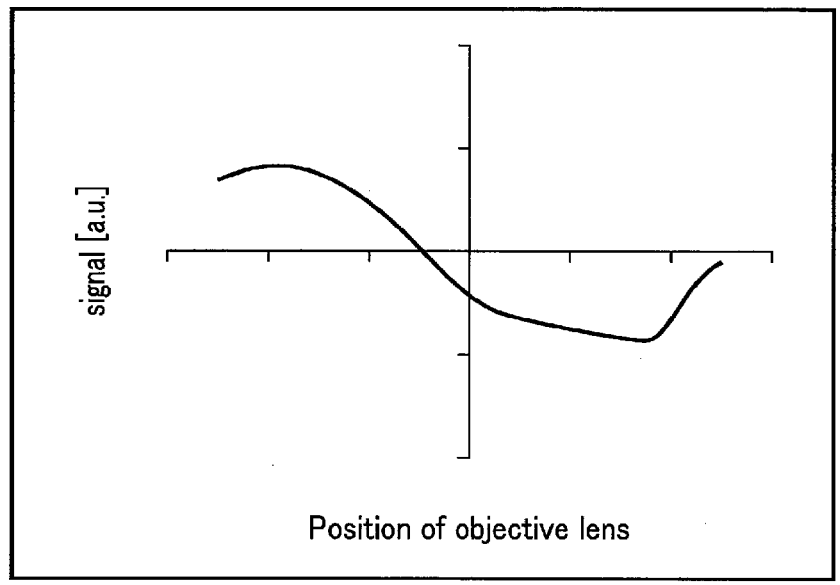
FIG. 17A is a graph showing an example of a focus error signal which is generated using all portions of a zero-order optical beam when spherical aberration is generated.

When, for example, a spherical aberration of 0.12 λrms is generated, a focus error signal is distorted greatly, as shown in FIG. 17A (in particular, there are inflection points where the sensitivity varies greatly). As a result, the focus servo may be unstable.

Figure 16:
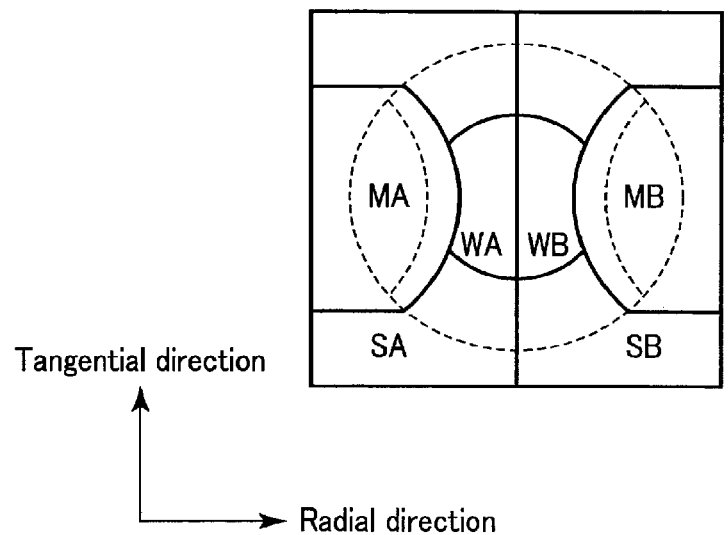
FIG. 16 shows an example of how an area separation pattern of an area-dividing diffraction grating is in the recording/reproducing apparatus of the third embodiment.

A recording/reproducing apparatus of the third embodiment can generate a focus error signal of little distortion when spherical aberration is generated, by determining the area-dividing pattern of the area-dividing diffraction grating 116 of the recording/reproducing apparatus shown in FIG. 1 and the characteristics of the diffraction grating elements of the area-dividing diffraction grating 116 as follows:

The area-dividing diffraction grating 116 may divide an incident beam in accordance with the area-dividing pattern shown in FIG. 16, for example. In FIG. 16, the solid lines indicate boundaries between the areas. In FIG. 16, the broken lines indicate (i) a cross sectional shape of a guide beam passing through the area-dividing diffraction grating 116 and (ii) a baseball pattern caused by the interference between the zero-order beam and the positive and negative first-order beam, which are included in the guide light diffracted by the guide groove of the guide layer.

In the area-dividing pattern shown in FIG. 16, area MA includes an interference area caused by the zero-order beam and the positive and negative first-order beams, which are diffracted by the guide groove of the guide layer. Likewise, area MB includes an interference area caused by the zero-order beam and the positive and negative first-order beams. The area other than areas MA and MB is divided by a dividing line into group A including area SA and area WB, and group B including area SB and area WB. The dividing line passes through the center of the optical axis of the guide light and is substantially parallel to the tangential direction. In group A, the center portion close to the optical axis of return light is area WA, and the circumferential portion other than area WA is area SA. In group B, the center portion close to the optical axis of the light is area WB, and the circumferential portion other than area WB is area SB.

For example, binary diffraction gratings are employed as diffraction grating elements corresponding to areas MA and MB of the area dividing pattern shown in FIG. 16. The diffraction efficiency of the zero-order beam of the diffraction grating elements is set to be lower than the diffraction efficiency of the zero-order beam of the diffraction grating elements corresponding to areas SA and SB. The diffraction efficiency ratio of these binary diffraction grating elements is, for example, (negative first-order):(zero-order):(positive first-order)=0.5:0:0.5.

For example, binary diffraction gratings are employed as diffraction grating elements corresponding to areas WA and WB of the area dividing pattern shown in FIG. 16. The diffraction efficiency of the zero-order beam of the diffraction grating elements is set to be lower than the diffraction efficiency of the zero-order beam of the diffraction grating elements corresponding to areas SA and SB. The diffraction efficiency ratio of these binary diffraction grating elements is, for example, (negative first-order):(zero-order):(positive first-order)=0.5:0:0.5.

For example, blazed diffraction gratings are employed as diffraction grating elements corresponding to areas SA and SB of the area dividing pattern shown in FIG. 16. The diffraction efficiency ratio of the blazed diffraction grating corresponding to area SA is, for example, (negative first-order):(zero-order):(positive first-order)=0:0.5:0.5. The diffraction efficiency ratio of the blazed diffraction grating corresponding to area SB is, for example, (negative first-order):(zero-order):(positive first-order)=0:0.5:0.5.

The zero-order beam passing through areas SA and SB is incident on the FES PD cell group. The positive first-order beam passing through areas MA and MB is focused on the MPP PD cell group. The positive first-order beam passing through areas SA, SB, WA and WB is focused on the SPP PD cell group.

In other words, the servo signal generation circuit 114 generates a focus error signal based mainly on the zero-order beam passing through areas SA and SB, generates a main push-pull signal based on the positive first-order beam passing through areas MA and MB, and generates a sub push-pull signal based on the positive first-order beam passing through areas SA, SB, WA and WB.

Therefore, if the diffraction efficiency of the zero-order beam of the diffraction grating elements corresponding to areas WA and WB is 0, then the servo signal generation circuit 114 generates a focus error signal without using the center portion of the zero-order beam (i.e., the circumferential portion passing through areas SA and SB is used).

Figure 17B:
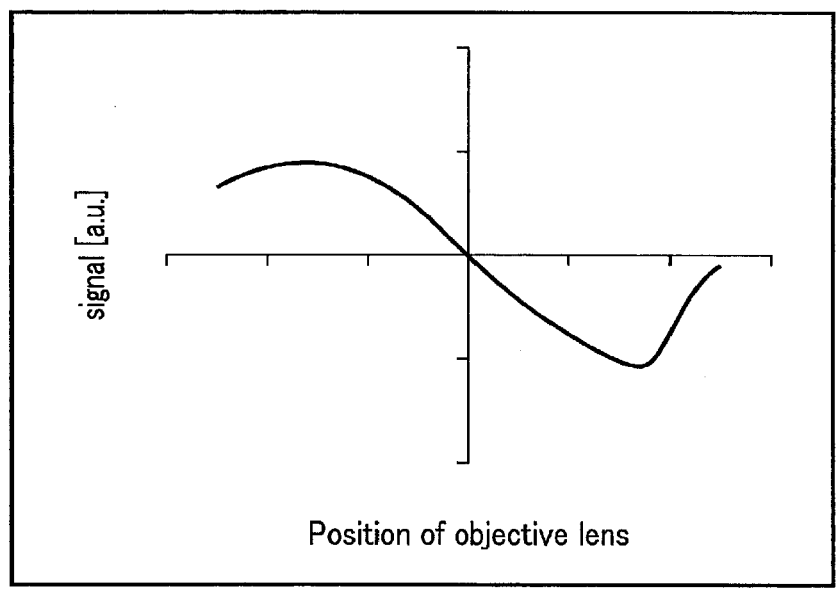
FIG. 17B is a graph showing an example of a focus error signal which is generated using circumferential portions of a zero-order optical beam (the central portion of which is not used) when spherical aberration is generated.

As shown in FIG. 17B, the focus error signal mentioned above is little distorted even when a spherical aberration of 0.12 λrms is generated (in particular, the sensitivity does not change greatly). As a result, stable focus servo is enabled.

Areas MA and MB shown in FIG. 16 correspond to areas MA and MB shown in FIG. 3, areas SA and WA shown in FIG. 16 correspond to area SA shown in FIG. 3, and areas SB and WB shown in FIG. 16 correspond to area SB shown in FIG. 3. Therefore, the servo signal generation circuit 114 of the present embodiment can generate a main push-pull signal and a sub push-pull signal equivalent or similar to those generated in the first embodiment.

As described above, the recording/reproducing apparatus of the third embodiment generates a focus error signal by mainly using the circumferential portion of the zero-order beam. Accordingly, the recording/reproducing apparatus of the third embodiment can generate a focus error signal that is little distorted, and stable focus servo is thus enabled.

The processing in the above-described embodiments can be implemented using a general-purpose computer as basic hardware. A program implementing the processing in each of the above-described embodiments may be stored in a computer readable storage medium for provision. The program is stored in the storage medium as a file in an installable or executable format. The storage medium is a magnetic disk, an optical disc (CD-ROM, CD-R, DVD, or the like), a magnetooptic disc (MO or the like), a semiconductor memory, or the like. That is, the storage medium may be in any format provided that a program can be stored in the storage medium and that a computer can read the program from the storage medium. Furthermore, the program implementing the processing in each of the above-described embodiments may be stored on a computer (server) connected to a network such as the Internet so as to be downloaded into a computer (client) via the network.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A recording/reproducing apparatus comprising:
an objective lens which focuses guide light on a guide layer in an information recording medium and which focuses information recording light on an information recording layer in the information recording medium;
an area-dividing diffraction grating which divides return light from the guide layer in accordance with a plurality of areas, including a first area and a second area that does not overlap the first area;
an astigmatic optical system which imparts astigmatism to a zero-order beam, a positive first-order beam and a negative first-order beam, into which the return light is divided by the area-dividing diffraction grating;
a light-receiving element including (i) a first light-detecting cell group which receives a zero-order beam to which astigmatism is imparted by the astigmatic optical system, (ii) a second light-detecting cell group which receives at least one of a positive first-order beam and a negative first-order beam, which passes the first area and made astigmatic by the astigmatic optical system, and (iii) a third light-detecting cell group which receives at least one of a positive first-order beam and a negative first-order beam, which passes the second area and made astigmatic by the astigmatic optical system; and
a generation circuit which generates a focus error signal based on an amount of light falling on the first light-detecting cell group, and generates a wobble reproduction signal based on an amount of light falling on the second light-detecting cell group and the third light-detecting cell group, wherein the generation circuit generates a tracking error signal based on the amount of light falling on the second light-detecting cell group, generates a sub tracking signal based on the amount of light falling on the third light-detecting cell group, and generates the wobble reproduction signal by multiplying the sub tracking signal by a positive constant, adding a resultant mathematical product to the tracking error signal, and extracting a high-frequency component corresponding to a result of addition.

2. The apparatus according to claim 1, wherein the generation circuit generates a tracking error signal based on the amount of light falling on the second light-detecting cell group, generates a sub tracking signal based on the amount of light falling on the third light-detecting cell group, and compensates for a variation of an offset component of the tracking error signal, which is caused when the objective lens is driven, by the sub tracking signal.

3. The apparatus according to claim 2, wherein the generation circuit compensates for the variation of the offset component by multiplying the sub tracking signal by a positive constant and subtracting a resultant mathematical product from the tracking error signal.

4. The apparatus according to claim 1, wherein the first area includes an interference area caused by the zero-order beam and the positive and negative first-order beams of the return light from the guide layer.

5. The apparatus according to claim 1, wherein the area-dividing diffraction grating includes a first diffraction grating element corresponding to the first area and a second diffraction grating element corresponding to the second area, and the first diffraction grating element and the second diffraction grating element are different in characteristics.

6. The apparatus according to claim 5, wherein the generation circuit generates the focus error signal based on an astigmatic method.

7. The apparatus according to claim 6, wherein the first diffraction grating has a diffraction efficiency of the zero-order beam lower than that of the second diffraction grating.

8. The apparatus according to claim 6, wherein the second area includes a third area which is a center portion close to an optical axis of the return light and a fourth area which is a circumferential portion other than the third area, the second diffraction grating element includes a third diffraction grating element corresponding to the third area and a fourth diffraction grating corresponding to the fourth area, the third diffraction grating has a diffraction efficiency of the zero-order beam lower than that of the fourth diffraction grating.

9. The apparatus according to claim 8, wherein the first diffraction grating element has a diffraction efficiency of the zero-order beam lower than that of the fourth diffraction grating element.

10. A recording/reproducing apparatus comprising:
an objective lens which focuses guide light on a guide layer in an information recording medium and which focuses information recording light on an information recording layer in the information recording medium;
an area-dividing diffraction grating which divides return light from the guide layer in accordance with a plurality of areas, including a first area and a second area that does not overlap the first area;
an astigmatic optical system which imparts astigmatism to a zero-order beam, a positive first-order beam and a negative first-order beam, into which the return light is divided by the area-dividing diffraction grating;
a light-receiving element including (i) a first light-detecting cell group which receives a zero-order beam to which astigmatism is imparted by the astigmatic optical system, (ii) a second light-detecting cell group which receives at least one of a positive first-order beam and a negative first-order beam, which passes the first area and made astigmatic by the astigmatic optical system, and (iii) a third light-detecting cell group which receives at least one of a positive first-order beam and a negative first-order beam, which passes the second area and made astigmatic by the astigmatic optical system; and
a generation circuit which generates a focus error signal based on an amount of light falling on the first light-detecting cell group, and generates a wobble reproduction signal based on an amount of light falling on the second light-detecting cell group and the third light-detecting cell group, wherein the generation circuit generates a tracking error signal based on the amount of light falling on the second light-detecting cell group, generates a sub tracking signal based on the amount of light falling on the third light-detecting cell group, and compensates for a variation of an offset component of the tracking error signal, which is caused when the objective lens is driven, by the sub tracking signal.

11. The apparatus according to claim 10, wherein the generation circuit compensates for the variation of the offset component by multiplying the sub tracking signal by a positive constant and subtracting a resultant mathematical product from the tracking error signal.

12. A recording/reproducing apparatus comprising:
an objective lens which focuses guide light on a guide layer in an information recording medium and which focuses information recording light on an information recording layer in the information recording medium;
an area-dividing diffraction grating which divides return light from the guide layer in accordance with a plurality of areas, including a first area and a second area that does not overlap the first area;
an astigmatic optical system which imparts astigmatism to a zero-order beam, a positive first-order beam and a negative first-order beam, into which the return light is divided by the area-dividing diffraction grating;
a light-receiving element including (i) a first light-detecting cell group which receives a zero-order beam to which astigmatism is imparted by the astigmatic optical system, (ii) a second light-detecting cell group which receives at least one of a positive first-order beam and a negative first-order beam, which passes the first area and made astigmatic by the astigmatic optical system, and (iii) a third light-detecting cell group which receives at least one of a positive first-order beam and a negative first-order beam, which passes the second area and made astigmatic by the astigmatic optical system; and
a generation circuit which generates a focus error signal based on an amount of light falling on the first light-detecting cell group, and generates a wobble reproduction signal based on an amount of light falling on the second light-detecting cell group and the third light-detecting cell group,
wherein the area-dividing diffraction grating includes a first diffraction grating element corresponding to the first area and a second diffraction grating element corresponding to the second area,
the first diffraction grating element and the second diffraction grating element are different in characteristics,
the generation circuit generates the focus error signal based on an astigmatic method, and
the first diffraction grating has a diffraction efficiency of the zero-order beam lower than that of the second diffraction grating.

13. A recording/reproducing apparatus comprising:
an objective lens which focuses guide light on a guide layer in an information recording medium and which focuses information recording light on an information recording layer in the information recording medium;
an area-dividing diffraction grating which divides return light from the guide layer in accordance with a plurality of areas, including a first area and a second area that does not overlap the first area;
an astigmatic optical system which imparts astigmatism to a zero-order beam, a positive first-order beam and a negative first-order beam, into which the return light is divided by the area-dividing diffraction grating;
a light-receiving element including (i) a first light-detecting cell group which receives a zero-order beam to which astigmatism is imparted by the astigmatic optical system, (ii) a second light-detecting cell group which receives at least one of a positive first-order beam and a negative first-order beam, which passes the first area and made astigmatic by the astigmatic optical system, and (iii) a third light-detecting cell group which receives at least one of a positive first-order beam and a negative first-order beam, which passes the second area and made astigmatic by the astigmatic optical system; and a generation circuit which generates a focus error signal based on an amount of light falling on the first light-detecting cell group, and generates a wobble reproduction signal based on an amount of light falling on the second light-detecting cell group and the third light-detecting cell group, wherein the area-dividing diffraction grating includes a first diffraction grating element corresponding to the first area and a second diffraction grating element corresponding to the second area, the first diffraction grating element and the second diffraction grating element are different in characteristics, the generation circuit generates the focus error signal based on an astigmatic method, the second area includes a third area which is a center portion close to an optical axis of the return light and a fourth area which is a circumferential portion other than the third area, the second diffraction grating element includes a third diffraction grating element corresponding to the third area and a fourth diffraction grating corresponding to the fourth area, and the third diffraction grating has a diffraction efficiency of the zero-order beam lower than that of the fourth diffraction grating.

14. The apparatus according to claim 13, wherein the first diffraction grating element has a diffraction efficiency of the zero-order beam lower than that of the fourth diffraction grating element.

* * * * *